United States Patent [19]

Hutchison

[11] Patent Number: 4,515,991
[45] Date of Patent: May 7, 1985

[54] ELECTRIC CABLE GLANDS

[75] Inventor: John B. Hutchison, Kingsley, England

[73] Assignee: BICC Public Limited Company, London, England

[21] Appl. No.: 482,144

[22] Filed: Apr. 5, 1983

[30] Foreign Application Priority Data

Apr. 22, 1982 [GB] United Kingdom ............... 8211669

[51] Int. Cl.³ .............................................. H02G 3/06
[52] U.S. Cl. .................................. 174/65 SS; 29/858
[58] Field of Search .................. 174/65 SS, 51, 78; 29/858

[56] References Cited

U.S. PATENT DOCUMENTS

| | | | |
|---|---|---|---|
| 2,816,949 | 12/1957 | Curtiss | 174/51 |
| 3,219,751 | 11/1965 | Pfendler et al. | 174/75 |
| 3,783,178 | 1/1974 | Philibert et al. | 174/86 |
| 4,015,329 | 4/1977 | Hutchison | 174/65 SS X |
| 4,022,966 | 5/1977 | Gajajiva | 174/65 SS |

FOREIGN PATENT DOCUMENTS

| | | | |
|---|---|---|---|
| 430356 | 6/1935 | United Kingdom | 285/256 |
| 700887 | 12/1953 | United Kingdom | |

OTHER PUBLICATIONS

CMP Glands Ltd Trade Catalogue 11th Edition, dated Feb. 1980, pp. 30–31.

Primary Examiner—A. T. Grimley
Assistant Examiner—D. A. Tone
Attorney, Agent, or Firm—Buell, Ziesenheim, Beck & Alstadt

[57] ABSTRACT

In a cable gland comprising two tubular members each wider at one end than at the other and telescopically engageable at their respective wider ends to define an annular chamber around a cable end inserted through the telescoped members with means for urging the tubular members axially together after the chamber has been filled with an appropriate sealing compound, at least one resilient contact finger is in electrical continuity with one of the tubular members and projects inwardly in order to make effective contact with a corrugated sheath or other metallic layer of the cable. The contact finger(s) is/are thus effectively embedded in the sealing compound, and locked in position when it sets, so giving a secure contact as well as an effective fluid-tight seal.

5 Claims, 17 Drawing Figures

ELECTRIC CABLE GLANDS

This invention relates to glands (also called terminators) for terminating electric cables with metallic sheaths or other metallic covering layers It is normally a requirement in such glands to ensure "earth (or ground) continuity" by providing an electrical connection between the cable sheath (or other covering layer) and the body, or some other accessible member, of the gland. This presents difficulties, especially when the layer to be contacted is a corrugated sheath, as different manufacturers use different corrugation profiles (and some annular and others helical ones), and even for a given cable the effective contact radius varies rapidly along the length of the cable (and in the case of helical corrugations around the circumference as well).

Contact-making devices comprising resilient contact fingers, usually backed up with rubber compression rings, have been tried but are not wholly satisfactory because movements under thermal and mechanical stresses are liable to result in insecure contacts, or even fracture of the fingers in some cases.

In accordance with the present invention, a cable gland comprises two tubular members each wider at one end than at the other and telescopically engageable at their respective wider ends to define an annular chamber around a cable end inserted through the telescoped members, means for urging the tubular members axially together to reduce the volume of the annular chamber, and at least one resilient contact finger in electrical continuity with and projecting inwardly from one of the said tubular members.

In putting the invention into use, the annular chamber is filled with a hard-setting compound in a pasty or viscous condition, and the compound is pressurised by urging the tubular members together before it sets, in order to securely embed the contact finger(s) and lock it or them in position. The compound may also provide a fluid-tight, pressure-tight and/or flameproof seal.

To allow the gland to be released, if required, from the apparatus to which the cable is connected without destroying the body of set compound, the tubular members are preferably urged together by outer members that enclose them and are screwed together either by a direct threaded engagement between them or with drawbolts or the like; when a flameproof gland is required, one of the outer members should fit one of the tubular members closely enough over a sufficient axial length to form a joint that satisfies flameproof requirements (a flame gap or flameproof path); typical requirements for an unthreaded joint would be for a diametral clearance less than 0.3 mm and an axial length of at least 12.5 mm. Manufacturing tolerances in such cases can be eased by making the tubular member and outer member concerned selfcentring, e.g. by providing them with mating conical surfaces.

The finger or fingers may be supported at one or both ends; the width of the (or each) finger may vary along its length, but will be small compared with the circumference of the annular chamber. Preferably there are a plurality of contact fingers distributed around the circumference of the gland; preferably they are all formed as inward projections from a common annular or nearly annular body, such as a split or solid tube or a slit or solid annular disc of a suitable resilient metal, for example beryllium copper, phosphor-bronze, stainless steel or even mild steel. This body may be force-fitted in the relevant tubular member or could be welded, rivetted or otherwise secured to it.

Prior to fitting on the cable, the finger(s) may extend either radially or obliquely, in the latter case preferably with the free end(s) nearer to the position that will be occupied by the apparatus to which the cable is to be connected than the fixed end(s).

Although the glands of the invention are primarily intended for use with corrugated cable sheaths of aluminium, copper, steel, etc., they can be used effectively on cables that include a smooth metallic sheath, e.g. of lead, or lapped tape armour of tinned steel etc.

The invention will be further described by way of example with reference to the accompanying drawings in which.

Figure 1:
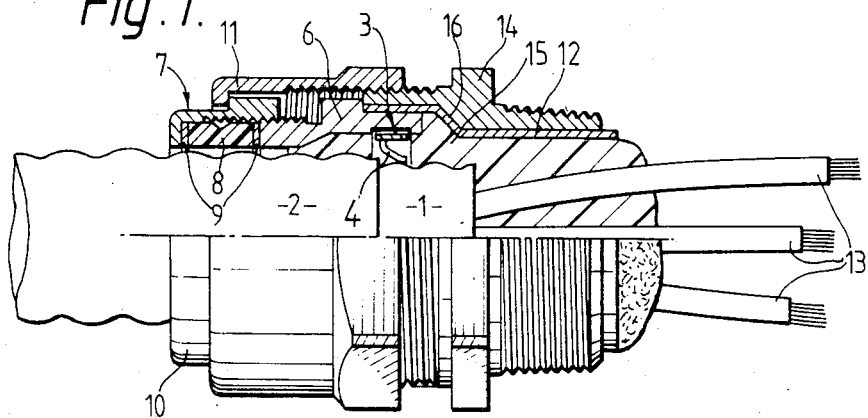
FIG. 1 is a cross-section through one particular form of termination made with a gland in accordance with the invention.
Figure 4:
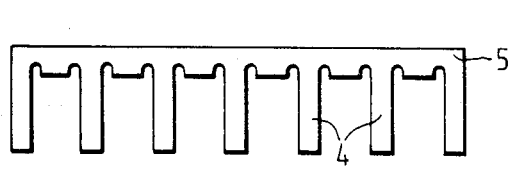
FIG. 4 is a plan view of a length of stamped strip for making the finger assembly of FIG. 2.
Figure 3:
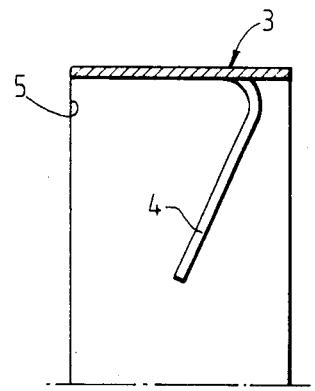
FIG. 3 is an enlarged, simplified cross-section on the line III—III in FIG. 2.
Figure 2:
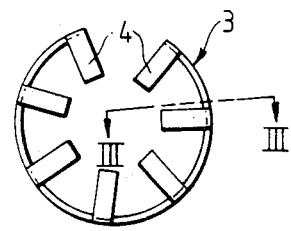
FIG. 2 is an end-view of a finger assembly forming part of the termination of FIG. 1.

Referring first to FIG. 1, this shows a flameproof termination for a three-core electric cable with a corrugated metal sheath 1 and a protective oversheath 2 of plastics material. In making this termination, a contact ring 3 is made by taking a short length from a phosphor bronze strip previously punched to form a number of fingers on one of its sides, rolling the cut length to form it into a tube and then bending each of the fingers 4 (FIGS. 2 and 3) sharply so as to exceed the elastic limit and leave each finger projecting radially inwards; the circular form can be retained by a circlip, interlocking, welding, etc., if required. FIG. 4 shows one form of punched strip which, cut to appropriate lengths, can be used for various sizes of contact ring. The opposite side 5 of the phosphor bronze strip may be flanged if desired to strengthen it. This contact ring is snap-fitted into an undercut recess in the inner surface of a first tubular member 6 (FIG. 1) which is wider at its right hand end than its left. This tubular member 6 supports an outer seal assembly 7 consisting of an elastomeric sealing ring 8 with skid washers 9 and a gland nut 10 threaded on the tubular member 6. This assembly, together with an outer gland nut 11 (whose function is to be explained later) is slipped over the prepared cable end and the gland nut 10 is tightened to compress the sealing ring 8 and so locate the tubular member 6 on the cable end.

A suitable quantity of a resinous sealing putty, such as that sold by the applicants under the trade mark "Bicaseal", is now made up and filled into the open end of the tubular member 6, and into the crutch of the cable, to a diameter roughly equal to the diameter of the mouth of the tubular member 6.

A second tubular member 12, which is wider at its left hand end than its right hand end, is now threaded over the ends of the conductors 13 and telescoped with the free end of the tubular member 6. Members 6 and 12 are then urged together using the outer gland nut 11 and an outer body member 14 which are screw threaded together. The body 14 may already be fitted in the apparatus to which a connection is to be made, or it could be fitted later, as detailed below. By urging the members 6 and 12 together, pressure is generated in the filling compound in the chamber 15, ensuring that the filling is void-free and makes an effective seal as well as locking the finger 4 in position.

The tubular member 12 is self-centering in the body portion 14 through the action of conical contact surfaces at 16 and the length of the joint between them (which is in fact the full length of the body 14), is sufficient to ensure a joint that meets flameproof requirements.

When the resin is set, it adheres firmly to the tubular members 6 and 12, but the outer members 11 and 14 are not in contact with the resin and can be unscrewed as required. If the body member is not already fixed in position in the apparatus, the outer gland nut 11 can be unscrewed to allow the body member 14 to be rotated for screwing it into the wall of the apparatus, and the gland then re-assembled. This process can be repeated, without detriment to the seal, if it is necessary to replace the whole or any relevant part of the apparatus.

Figure 5:
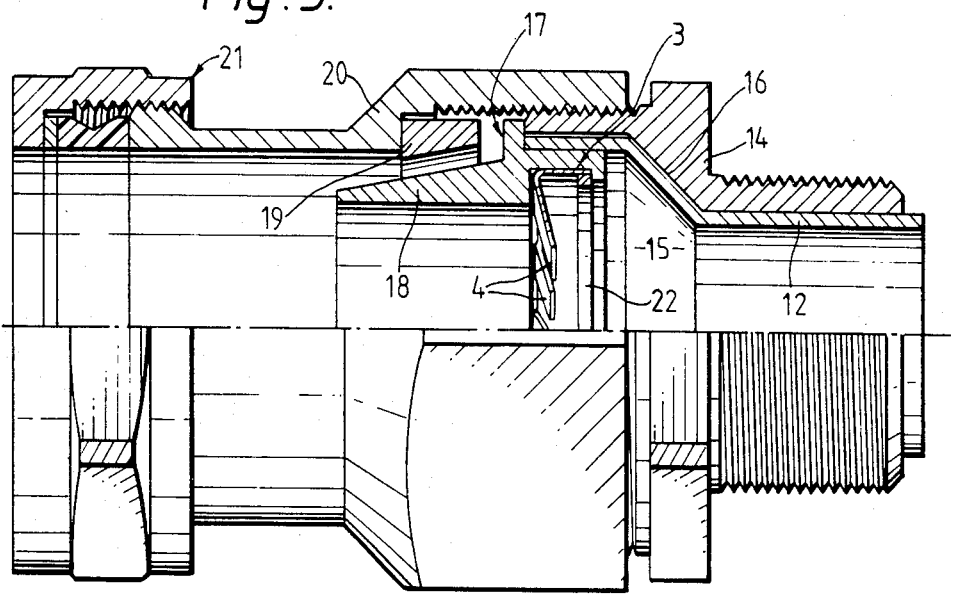
FIG. 5 is a partly-sectioned view of a modified form of gland in accordance with the invention.

The gland shown in FIG. 5 is designed for use with a cable having wire armour over the sheathing layer to which contact is to be made by the fingers 4. The first tubular member 17 (corresponding to 6 in FIG. 1) is modified to provide a cone 18 on which the ends of the armour wires are laid and secured with a clamping ring 19 urged into engagement by a gland barrel 20 threaded on the body 14. This is done in a preliminary step prior to insertion of filling compound into the chamber 15 in order to lock the tubular member 17 in position. After unscrewing the barrel, the subsequent procedure is substantially as before, except that the outer seal 21 needs to be tightened after the barrel has been finally screwed up.

FIG. 5 also illustrates the use of a circlip 22 to hold the finger assembly 3 more securely in position.

Figure 6:
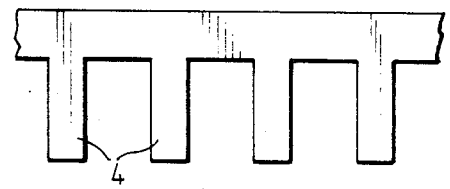
FIGS. 6–8 show stamped strips alternative to the one shown in FIG. 4.
Figure 7:
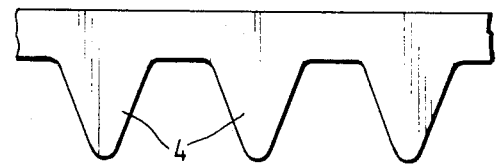
Figure 8:
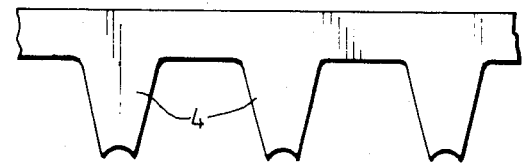
Figure 9:
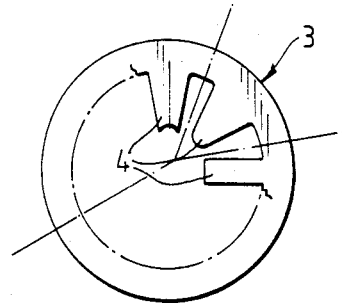
FIG. 9 is a composite view showing three forms of finger assembly alternative to the one shown in FIG. 2.

As illustrated by FIGS. 6–8, the fingers 4 may be parallel-sided or tapered, and their ends may be straight, convex or concave.

Figure 12:
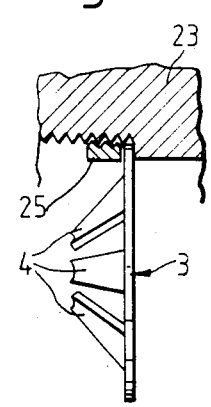

As illustrated by FIGS. 9–12, instead of rolling the finger assembly 3 from a punched strip and bending the fingers inwards, it may be stamped in flat disc form from sheet metal and the fingers 4 subsequently bent outwards (if necessary); the disc form assembly may be force-fitted int the tubular mounting member 33 (FIG. 10), locked in position by local deformations 24 (FIG. 11) or secured with a threaded ring 25 (FIG. 12).

Figure 13:
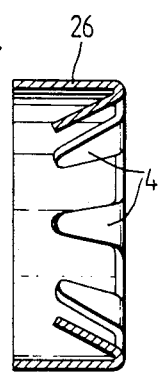
FIGS. 13 and 14 show two more alternative finger assemblies, which can be used separately or together.
Figure 14:
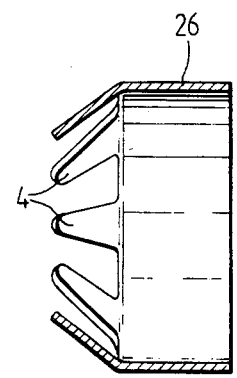
Figure 10:
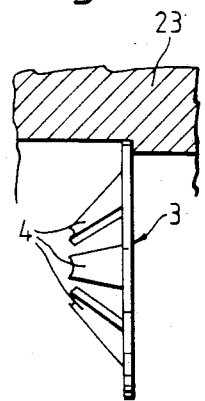
FIGS. 10, 11 and 12 show three ways of making the assembly shown in FIG. 9.
Figure 11:
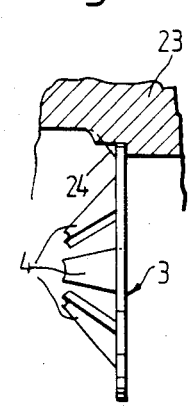

A further alternative is to form the finger assembly from a seamless or welded tube 26 (FIGS. 13–14) with the fingers 4 bent through an appropriate angle, either obtuse or acute. Two or more finger assemblies could be used for added security.

Figure 15:
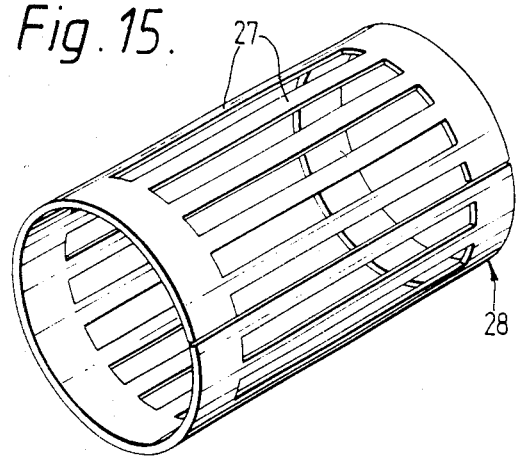
FIGS. 15–17 illustrate another alternative finger assembly and its use.
Figure 16:
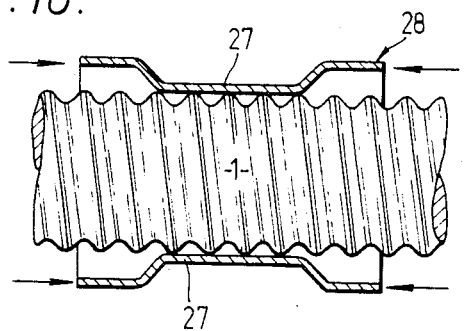
Figure 17:
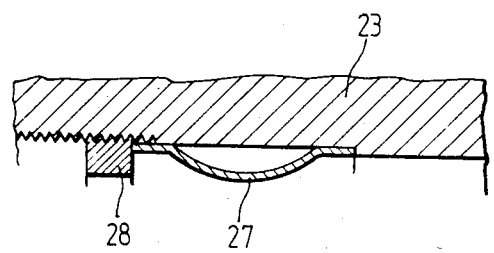

FIGS. 15–17 illustrate the use of fingers that are supported at both ends, which may have advantages if the layer of the cable to be contacted is liable to be torn; for example a thin metal tape layer. Fingers 27 are formed by punching rectangular holes in a metal sheet which is subsequently rolled to form a tube 28 (or a preformed tube could be used, but is more difficult to fabricate); the fingers are bowed inwardly by applying axial pressure while preventing any outward movement (as shown in FIG. 16) or by a squeezing action. FIG. 17 illustrates one practical way of applying axial pressure by means of a ring 28 threaded in the mounting member 23.

What I claim as my invention is:

1. A cable gland comprising:
   two tubular members each having a wider end and a narrower end and telescopically engageable at their respective wider ends to define, when a cable end is inserted through the telescoped members, an annular chamber around said cable ends, said chamber containing a hard setting compound in pasty or viscous condition;
   means for urging said tubular members axially together to reduce the volume of said annular chamber and pressurize said hard setting compound;
   and at least one resilient contact finger in electrical continuity with and projecting inwardly from one of said tubular members.

2. A gland as claimed in claim 1 in which said means for urging said tubular members together comprises outer members that enclose them and are screwed together.

3. A gland as claimed in claim 2 in which one of said outer members is in flameproof engagement with one of said tubular members.

4. A gland as claimed in claim 1 in which a plurality of said contact fingers are distributed around the circumference of the gland and are formed as inward projections from a common substantially annular body.

5. A method of making a termination comprising:
   providing two tubular members each having a wider end and a narrower end;
   telescopially engaging said tubular members at their respective wider ends and inserting a cable end through the telescoped said tubular members to define an annular chamber around said cable end;
   there being within said chamber at least one resilient contact finger in electrical continuity with and projecting inwardly from one of said tubular members to contact a conductive part of said cable and;
   filling said annular chamber with a hard setting sealing pasty or viscous compound in an unset condition;
   and pressurizing said compound by urging said tubular members axially together to reduce the volume of said annular chamber before said compound sets, so securely embedding said at least one contact finger and locking same in position.

* * * * *

UNITED STATES PATENT AND TRADEMARK OFFICE
CERTIFICATE OF CORRECTION

PATENT NO. : 4,515,991

DATED : May 7, 1985

INVENTOR(S) : JOHN B. HUTCHISON

It is certified that error appears in the above-identified patent and that said Letters Patent is hereby corrected as shown below:

Column 3, line 51, change "9-12" to --7-12--.

Column 4, line 45, change "telescopially" to --telescopically--.

Signed and Sealed this

Tenth Day of December 1985

[SEAL]

Attest:

DONALD J. QUIGG

Attesting Officer

Commissioner of Patents and Trademarks